United States Patent
Takaki (10) Patent No.: US 11,242,039 B2
(45) Date of Patent: Feb. 8, 2022

(54) BRAKING ASSISTANCE METHOD AND APPARATUS FOR VEHICLE

(71) Applicant: DENSO CORPORATION, Kariya (JP)

(72) Inventor: Ryo Takaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 131 days.

(21) Appl. No.: 16/662,679

(22) Filed: Oct. 24, 2019

(65) Prior Publication Data

US 2020/0055495 A1    Feb. 20, 2020

Related U.S. Application Data (63) Continuation of application No. PCT/JP2018/015078, filed on Apr. 10, 2018.

(30) Foreign Application Priority Data

Apr. 25, 2017  (JP) .............................. JP2017-085794

(51) Int. Cl.
| | |
|---|---|
| *B60T 7/22* | (2006.01) |
| *B60T 8/17* | (2006.01) |
| *B60T 8/171* | (2006.01) |
| *B60T 8/172* | (2006.01) |

(52) U.S. Cl.
CPC .................. *B60T 7/22* (2013.01); *B60T 8/17* (2013.01); *B60T 8/171* (2013.01); *B60T 8/172* (2013.01); *B60T 2201/03* (2013.01); *B60T 2210/32* (2013.01)

(58) Field of Classification Search
CPC ... B60T 7/22; B60T 8/17; B60T 8/171; B60T 8/172; B60T 2201/03; B60T 2210/32; B60W 30/16; G08G 1/161; G08G 1/22
See application file for complete search history.

(56) References Cited

U.S. PATENT DOCUMENTS

| | | | |
|---|---|---|---|
| 2006/0195250 A1* | 8/2006 | Kawaguchi | G08G 1/161 |
| | | | 701/117 |
| 2012/0010799 A1* | 1/2012 | Braunberger | B60Q 9/008 |
| | | | 701/70 |
| 2016/0214480 A1* | 7/2016 | Solyom | B60K 31/00 |

FOREIGN PATENT DOCUMENTS

| | | |
|---|---|---|
| JP | H05-270371 A | 10/1993 |
| JP | 2005-199930 A | 7/2005 |
| JP | 2007-246089 A | 9/2007 |
| JP | 2011-197915 A | 10/2011 |
| JP | 2014-000926 A | 1/2014 |
| JP | 2014-148293 A | 8/2014 |

\* cited by examiner

*Primary Examiner* — Anne Marie Antonucci
*Assistant Examiner* — Andrew J Cromer
(74) *Attorney, Agent, or Firm* — Maschoff Brennan (57) ABSTRACT

In a vehicle braking assistance apparatus, a detection unit detects a target object in a traveling lane of an own vehicle. A braking assistance level determination unit, which determines a braking assistance level of the own vehicle by a braking device, determines, upon detecting a cut-in vehicle that has changed a travelling course to the travelling lane of the own vehicle using a detection signal from the detection unit, whether the cut-in vehicle is accelerable. The braking assistance level determination unit sets the braking assistance level of the braking to a high value that is higher than a standard value upon determining that the cut-in vehicle is not accelerable.

10 Claims, 8 Drawing Sheets

| No. | DETERMINATION PARAMETER | STANDARD LEVEL | HIGH LEVEL |
|---|---|---|---|
| 1 | TTC | USE | USE |
| 2 | LATERAL POSITION | USE | USE |
| 3 | PREDICTED COLLISION LATERAL POSITION | USE | NON-USE |
| 4 | PRESENCE PROBABILITY | USE | USE |

BRAKING ASSISTANCE METHOD AND APPARATUS FOR VEHICLE

CROSS-REFERENCE TO RELATED APPLICATIONS

This application is a bypass continuation application of currently pending international application No. PCT/JP2018/015078 filed on Apr. 10, 2018 designating the United States of America, the entire disclosure of which is incorporated herein by reference. The internal application is based on and claims the benefit of priority from Japanese Patent Application Publication No. 2017-085794 filed on Apr. 25, 2017. The entire disclosure of each of the international application and the Japanese Patent Application is incorporated herein by reference.

TECHNICAL FIELD

The present disclosure relates to a braking assistance technique for avoiding a collision of an own vehicle with other vehicles, in particular, to a braking assistance technique for avoiding a collision of an own vehicle with cut-in vehicles.

BACKGROUND

There is known a technique for avoiding a collision of an own vehicle with a cut-in vehicle that makes a lane change to thereby cut into a section of the own lane between a preceding vehicle traveling ahead of the own vehicle and the own vehicle.

SUMMARY

A braking assistance apparatus according to an aspect of the present disclosure determines, when detecting a cut-in vehicle that has changed a travelling course to a travelling lane of an own vehicle using a detection signal from a detection unit, whether the cut-in vehicle is accelerable. The braking assistance apparatus sets the braking assistance level of the braking to a high value that is higher than a standard value upon determining that the cut-in vehicle is not accelerable.

BRIEF DESCRIPTION OF THE DRAWINGS

FIG. 5 is an explanatory diagram schematically showing a positional relationship between a preceding vehicle and an own vehicle before a cut-in vehicle cuts in.

FIG. 6 is an explanatory diagram schematically showing a positional relationship between the preceding vehicle and the own vehicle after the cut-in vehicle cuts in.

DESCRIPTION OF EMBODIMENTS

Viewpoint of Present Disclosure

An example of such a technique for avoiding a collision of an own vehicle with a cut-in vehicle that makes a lane change to thereby cut into a section of an own lane between a preceding vehicle and the own vehicle is disclosed in patent document 1.

This technique for avoiding a collision of an own vehicle with a cut-in vehicle, that is, a conventional technique for addressing such a cut-in vehicle, sets a braking assistance level to be a higher value when detecting a cut-in vehicle than a normal value of the braking assistance level to thereby aim to avoid a collision with of the own vehicle with the cut-in vehicle.

When the braking assistance level is set to be a higher value, this conventional technique is configured to adjust a value of a braking device to be a smaller value. This conventional technique may cause concerns about a collision of the own vehicle with vehicles behind the own vehicle, and also cause a driver of the own vehicle to have experience a relatively high deceleration.

Traveling condition parameters of the cut-in vehicle, which has cut in the lane of the own vehicle, include, for example, a speed and a traveling course of the cut-in vehicle, and the travelling conditions of the cut-in vehicle depend on a relative relationship between the preceding vehicle and the cut-in vehicle.

Some values of the travelling condition parameters of the cut-in vehicle may eliminate the need for braking assistance with a higher value of the braking assistance level.

It is therefore desired to perform the braking assistance for avoiding a collision of an own vehicle with a cut-in vehicle in accordance with the traveling condition parameters of the cut-in vehicle.

The present disclosure, which has been made to solve the problem described above, can be implemented as the following aspects.

A braking assistance apparatus according to a first exemplary aspect of the present disclosure includes a detection unit configured to detect a target object in a traveling lane of an own vehicle, and a braking assistance level determination unit for determining a braking assistance level of the own vehicle by a braking device.

The braking assistance level determination unit is configured to determine, upon detecting a cut-in vehicle that has changed a travelling course to the travelling lane of the own vehicle using a detection signal from the detection unit, whether the cut-in vehicle is accelerable.

The braking assistance level determination unit is configured to set the braking assistance level of the braking to a high value that is higher than a standard value upon determining that the cut-in vehicle is not accelerable.

The braking assistance apparatus according to the first aspect sets the braking assistance level of the braking to a high value that is higher than a standard value upon determining that the cut-in vehicle is not accelerable.

A braking assistance method according to as a second exemplary aspect of the present disclosure includes (1) Detecting a cut-in vehicle changing a traveling course to a traveling lane of an own vehicle (2) Determining whether the cut-in vehicle is accelerable (3) Setting the braking assistance level of the braking to a high value that is higher than a standard value upon determining that the cut-in vehicle is not accelerable Each of the apparatus and method according to the first and second exemplary aspects makes it possible to perform, based on the travelling state of the cut-in vehicle, the braking assistance operation for avoiding a collision with the cut-in vehicle.

EMBODIMENTS

The following describes embodiments of braking assistance methods and apparatuses for a vehicle according to the present disclosure.

First Embodiment

Figure 1:
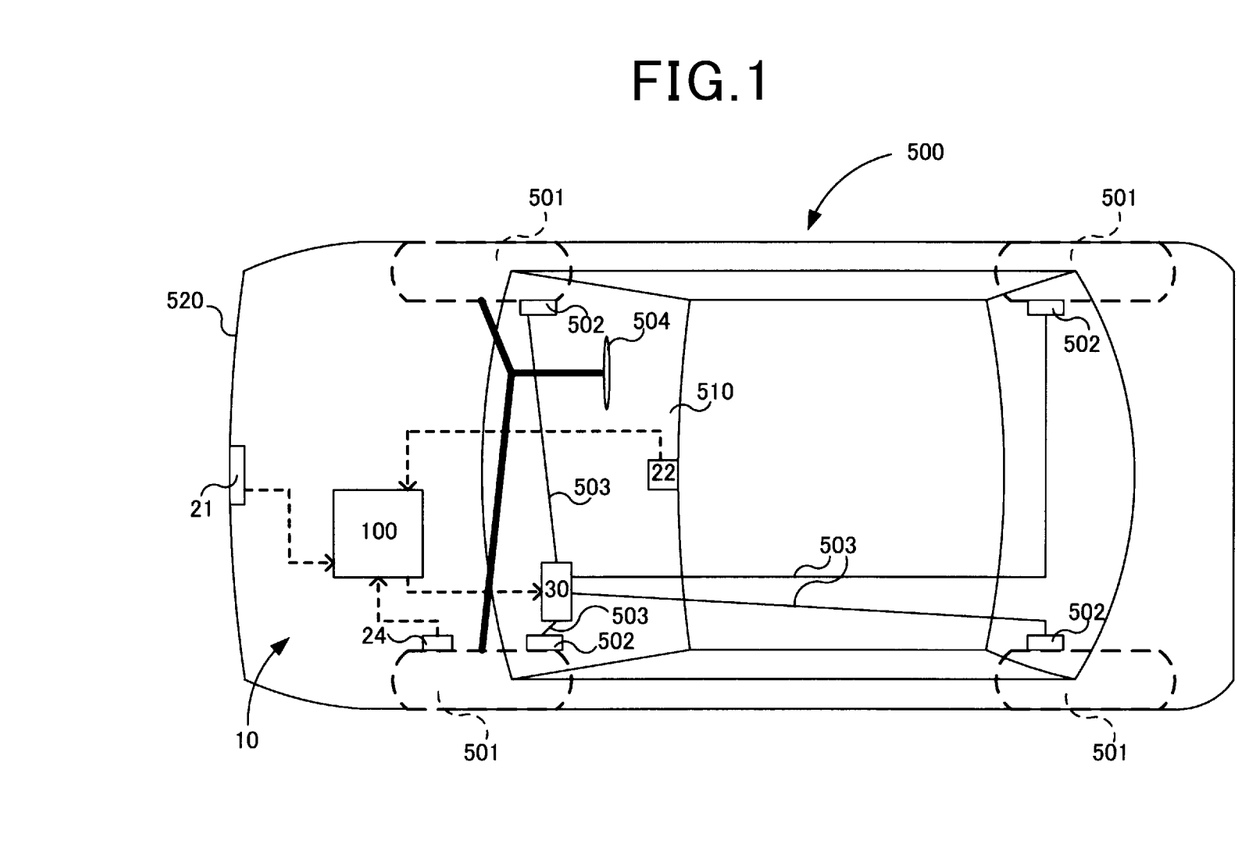
FIG. 1 is an explanatory diagram showing a vehicle in which a braking assistance apparatus is installed according to the first embodiment.

As shown in FIG. 1, a braking assistance apparatus 10 according to the first embodiment is mounted on a vehicle, i.e. an own vehicle, 500. The braking assistance apparatus 10 includes a control apparatus 100, a millimeter wave radar 21, a monocular camera 22, wheel speed sensors 24, and a braking assistance actuator 30.

The vehicle 500 includes wheels 501, braking devices 502, a braking line 503, a steering wheel 504, a front windshield 510, and a front bumper 520. The vehicle 500 can be equipped with at least the millimeter wave radar 21 as a detector for detecting target objects or can be equipped with at least one of the monocular camera 22 and a laser radar (LIDAR) together with the millimeter wave radar 21. The vehicle 500 can be equipped with a stereo camera instead of the millimeter wave radar 21, or with a stereo camera together with the millimeter wave radar 21. The first embodiment uses the millimeter wave radar 21 and the monocular camera 22 each provided to the vehicle 500 as a detector.

The braking devices 502 are provided for the respective wheels 501. Each braking device 502 performs braking of the corresponding wheel 501 by brake fluid pressure supplied, in accordance with a driver's brake pedal operation, through the braking line 503. The braking line 503 includes a brake piston for producing the brake fluid pressure corresponding to an operation of the brake pedal, and brake fluid lines. In the first embodiment, the braking assistance actuator 30, which is provided in the braking line 503, is capable of hydraulically controlling the brake fluid pressure independently of the brake pedal operation, making it possible to perform a braking assistance operation.

The first embodiment can use the following configuration that the braking line 503 includes control signal lines in place of the brake fluid lines, and an electric actuator provided in each braking device 502 is driven through the corresponding one of the control signal lines.

The steering wheel 504 is connected to the front wheels 501 via a steering rod and a steering unit.

Figure 2:
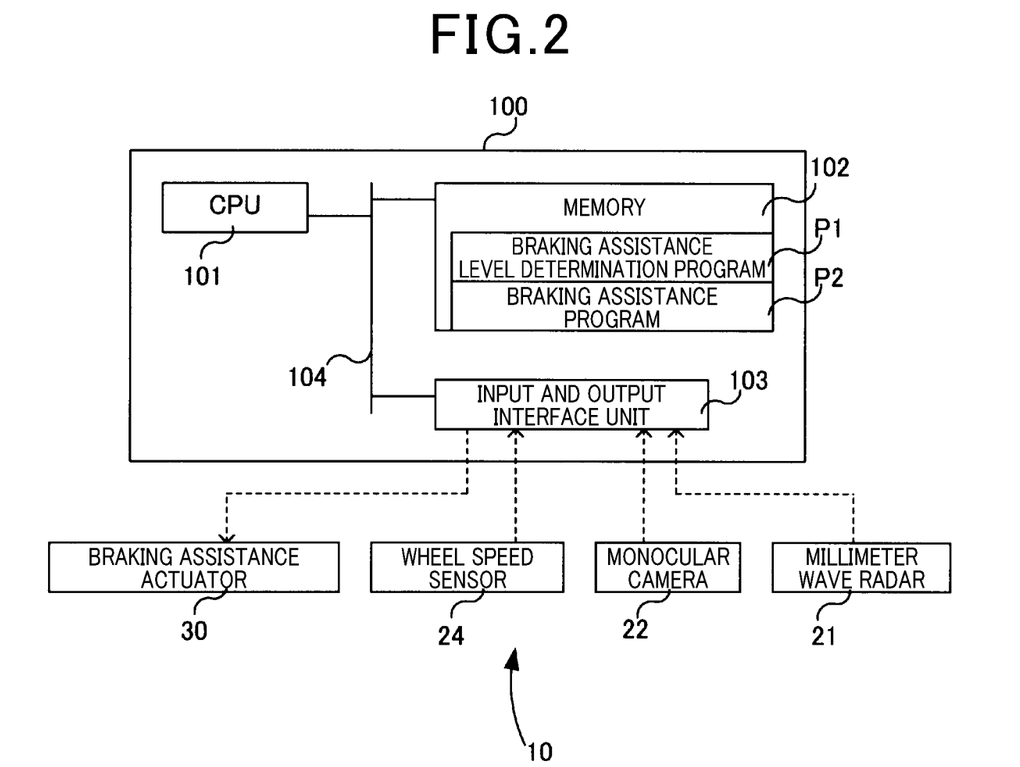
FIG. 2 is a block diagram showing a functional configuration of a control apparatus provided in the braking assistance apparatus according to the first embodiment.

As shown in FIG. 2, the control apparatus 100 includes a central processing unit (CPU) 101, a memory device 102, an input and output (I/O) interface unit 103, and a bus 104. The CPU 101, the memory device 102, and the I/O interface unit 103 are bidirectionally communicably connected to each other via the bus 104.

The memory device 102 includes (1) A non-volatile and read-only memory, such as a ROM, storing a braking assistance level determination program P1 for determining a value of a braking assistance level when detecting a cut-in vehicle (2) A rewritable memory, such as a RAM, storing a braking assistance program P2 for causing the braking devices 502 to each perform a corresponding braking assistance operation.

The CPU 101 loads the braking assistance level determination program P1 stored in the memory device 102 to the rewritable memory, and runs the loaded program P1 to accordingly serve as a braking assistance level determination unit.

Similarly, the CPU 101 runs the braking assistance program P2 to accordingly serve as a braking assistance control unit that includes the braking assistance actuator 30 for applying fluid pressure for the braking assistance operation to the braking line 503 in response to receiving a control signal from the CPU 101.

The braking assistance control unit can be divided into (1) The CPU 101 serving as a control unit for executing the braking assistance program P2, which controls execution of the braking assistance operation, to thereby send a control signal to the braking assistance actuator 30

(2) The braking assistance actuator 30 serving as a drive unit for driving the braking devices 502 for assistance of the braking operations The CPU 101 may be a single CPU, or may be a plurality of CPUs, each of which runs each of the programs, or may be a multitasking type CPU that can simultaneously execute multiple programs.

The millimeter wave radar 21, the monocular camera 22, the wheel speed sensors 24, and the braking assistance actuator 30 are connected to the I/O interface unit 103 via respective control signal lines. Measurement information output from each of the millimeter wave radar 21, the monocular camera 22, and the wheel speed sensors 24 is inputted to the I/O interface unit 103, and a control signal indicative of a value of the braking assistance level is outputted from the I/O actuator 103 to the braking assistance actuator 30.

The millimeter wave radar 21 is a sensor, which includes a signal transmitter unit and a signal receiver unit, configured to transmit millimeter waves and receive reflected waves, i.e. echoes, generated based on reflection of the emitted millimeter waves by a target object to thereby detect a position and a distance of the target object.

The millimeter wave radar 21 of the first embodiment is disposed at the center of the front bumper 520, but the millimeter wave radar 21 can consist of a plurality of millimeter wave radars 21, and can be disposed on an entire surface of the front bumper 520 or can be disposed on both lateral sides of the front bumper 520.

The millimeter-wave radar 21 can include a signal processing circuit configured to perform predetermined signal processing based on the received echoes from a target object to thereby output a measurement signal indicative of information about the sequence of points; each of the points represents a typical position of the target object. The measurement signal can represent one or more unprocessed received waves. When the unprocessed received waves are used as the measurement signal, the control apparatus 100 can be configured to perform predetermined signal processing based on the unprocessed received waves unprocessed received waves to thereby determine a position and a distance of the target object.

Instead of the millimeter wave radar, the LIDAR may be used. For example, the CPU 101 can calculate, based on the measurement result sent from the millimeter wave radar 21, 1. A distance from the own vehicle, to which a reference character M0 can also be assigned, to a preceding vehicle M1
2. A distance from the own vehicle M0 to a cut-in vehicle M2
3. A relative speed between the own vehicle M0 and the preceding vehicle M1
4. A relative speed between the own vehicle M0 and the cut-in vehicle M2
5. A time-to-collision (TTC) representing a margin of time until which the own vehicle M0 would collide with the preceding vehicle M1
6. A TTC representing a margin of time until which the own vehicle M0 would collide with the cut-in vehicle M2

The CPU 101 obtains the above distance, relative speed, and TTC of the preceding vehicle M1 as first attribute information about the preceding vehicle M1, and obtains the above distance, relative speed, and TTC of the preceding vehicle M1 as attribute information about the preceding vehicle M1, and also obtains the above distance, relative speed, and TTC of the cut-in vehicle M2 as first attribute information about the cut-in vehicle M2.

The monocular camera 22 is an imaging sensor including an imaging device, such as a CCD, and is configured to 1. Receive visible light to thereby detect information on the outline of a target object
2. Output the detected outline information as image data The image data outputted from the monocular camera 22 is comprised of a plurality of successive frame images in time series. Each frame image is comprised of pixel data items. The CPU 101 can calculate, based on the image data outputted from the monocular camera 22, 1. External dimensions of each of the preceding vehicle M1 and the cut-in vehicle M2
2. A relative distance of each of the preceding vehicle M1 and the cut-in vehicle M2 relative to the own vehicle M0

The CPU 101 obtains the above external dimensions and relative distance of the preceding vehicle M1 as second attribute information about the preceding vehicle M1, and obtains the above external dimensions and relative distance of the cut-in vehicle M2 as second attribute information about the cut-in vehicle M2.

Providing the monocular camera 22 to the own vehicle 500 enables, even if the target objects are two-wheel vehicles, the braking assistance apparatus 10 to detect the preceding vehicle M1 and the cut-in vehicle M2 with higher accuracy.

In the first embodiment, the monocular camera 22 is disposed at an upper center of the front windshield 510. Each pixel data item outputted from the monocular camera 22 is a monochrome pixel data item or a color pixel data item. A stereo camera having two lenses may be used instead of the monocular camera 22.

Each wheel speed sensor 24 is a sensor, which is provided for the corresponding one of the wheels 501, for detecting the rotational speed of the corresponding one of the wheels 501. Each wheel speed sensor 24 outputs a measurement signal indicative of a voltage that is proportional to the corresponding wheel speed, or outputs a signal of pulses having an interval representing the corresponding wheel speed. Using the measurement signals sent from the respective wheel speed sensors 24 enables information on the speed of the own vehicle 500 and the travelled distance of the own vehicle 500.

The braking assistance actuator 30 is an actuator that causes each of the braking devices 502 to execute braking independently of a driver's operation of a brake pedal.

The braking assistance actuator 30 of the first embodiment is installed in the braking line 503. The braking assistance actuator 30 is configured to increase or decrease hydraulic pressure in the braking line 503 in accordance with a control signal sent from the control apparatus 100.

The braking assistance actuator 30 is comprised of, for example, a module including an electric motor and a hydraulic piston driven by the electric motor. Alternatively, a braking control actuator can be used, which is already used for an anti-skid brake system or an anti-lock brake system.

The following describes a braking assistance level determination routine executed by the braking assistance apparatus 10 according to the first embodiment with reference to FIGS. 3 to 6.

Figure 3:
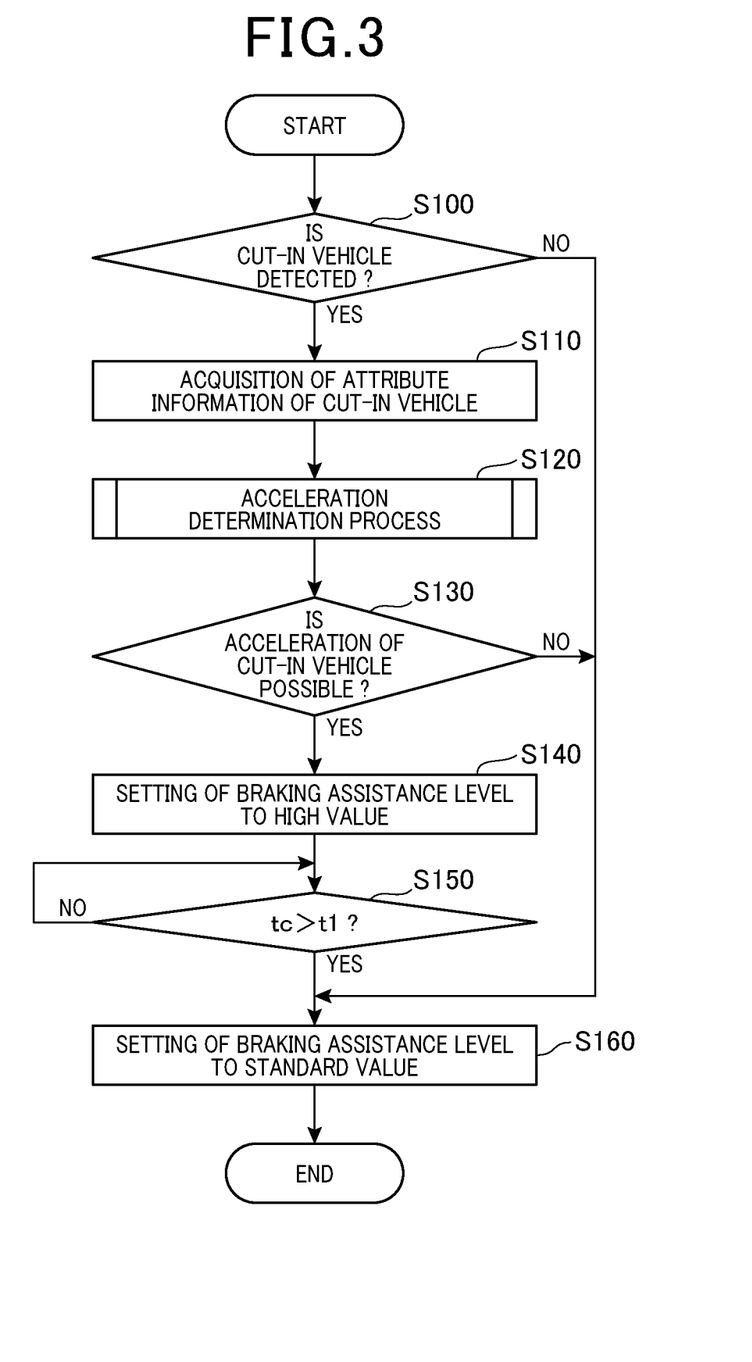
FIG. 3 is a flowchart showing a braking assistance level determination routine performed by the braking assistance apparatus according to the first embodiment.
Figure 4:
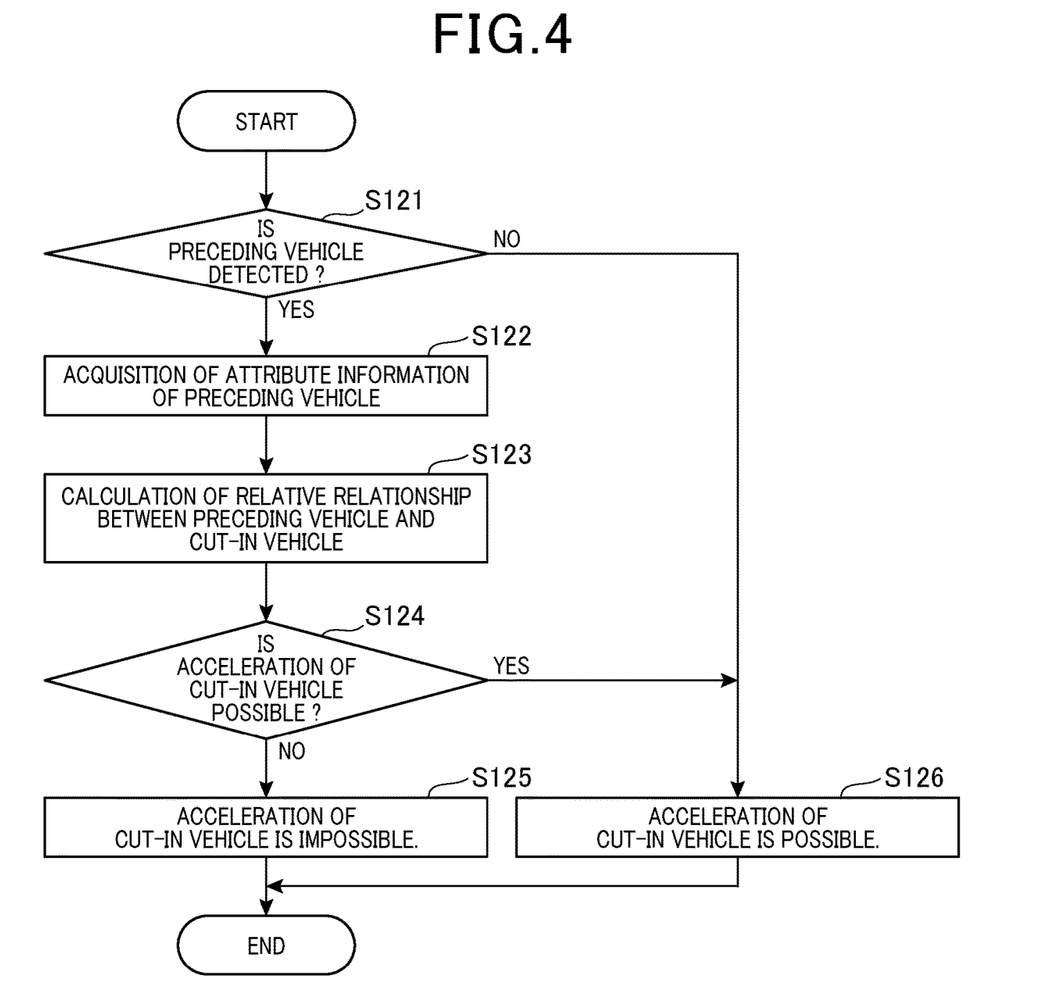
FIG. 4 is a flowchart showing an acceleration determination subroutine performed by the braking assistance apparatus according to the first embodiment.

The CPU 101 runs the braking assistance level determination program P1 to thereby execute the braking assistance level determination routine illustrated in FIGS. 3 and 4 every predetermined interval, for example, every several milliseconds, from turn-on of a start switch to turn-off of the start switch. Alternately, the CPU 101 runs the braking assistance level determination program P1 to thereby execute the braking assistance level determination routine in response to detection of a cut-in vehicle as a trigger.

In step S100 of the braking assistance level determination routine, the CPU 101 determines whether a cut-in vehicle M2 is detected on the traveling lane of the own vehicle M0 (step S100). The own vehicle M0 is a vehicle mounting the braking assistance apparatus 10 according to the first embodiment. The cut-in vehicle M2 indicates another vehicle travelling side-by-side with the own vehicle M0 or travelling a lane adjacent to the traveling lane of the own vehicle M0, and changing its traveling course to the traveling lane of the own vehicle M0.

A region in the traveling lane of the own vehicle M0 indicates an extending region of the traveling lane of the own vehicle M0 in the travelling direction of the own vehicle M0 among lanes defined on a corresponding travelling road; each lane has a one-vehicle width. Alternatively, a region on the traveling lane of the own vehicle M0 indicates a region on the travelling road in a direction in which the own vehicle M0 is scheduled to travel.

Identifying lane markers on a road using the monocular camera 22 enables lanes on the road to be detected. The millimeter wave radar 21 can be configured such that its detection range of reflected waves is set to a width of the corresponding travelling lane. This configuration enables the cut-in vehicle M2 to be detected easily.

The CPU 101 can detect the existence of the cut-in vehicle M2 when detecting at least one of the following first to third situations:

1. A rapid decrease in the distance measured by the millimeter wave radar
2. An entrance of a vehicle into the travelling lane
3. A rapid decrease in the time-to-collision (TTC)

Additionally, the CPU 101 can detect the existence of the cut-in vehicle M2 when detecting a combination of the following fourth and fifth situations and the above first to third situations:

4. An activation of a closer-side direction indicator of a vehicle, which is travelling side by side of the own vehicle M0 detected by the monocular camera 22, toward the travelling lane of the own vehicle M0

5. A result of determination that the difference between the own vehicle M0 and another vehicle travelling side-by-side of the own vehicle M0 becomes shorter than the width of the travelling lane of the own vehicle M0

Note that the first to third situations can be detected by at least one of the millimeter wave radar 21 and the monocular camera 22.

Upon detecting no cut-in vehicles M2 (NO in step S100), the CPU 101 sets the braking assistance level to a standard value in step S106, and thereafter terminates the braking assistance level determination routine.

Figure 5:
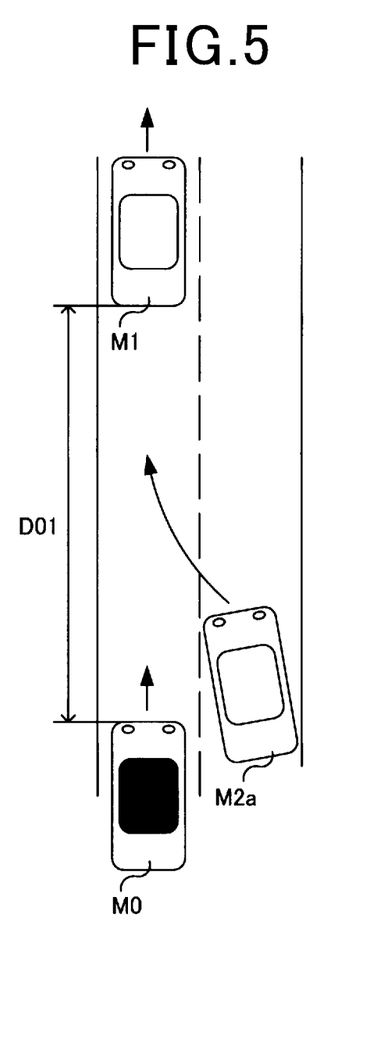
Figure 6:
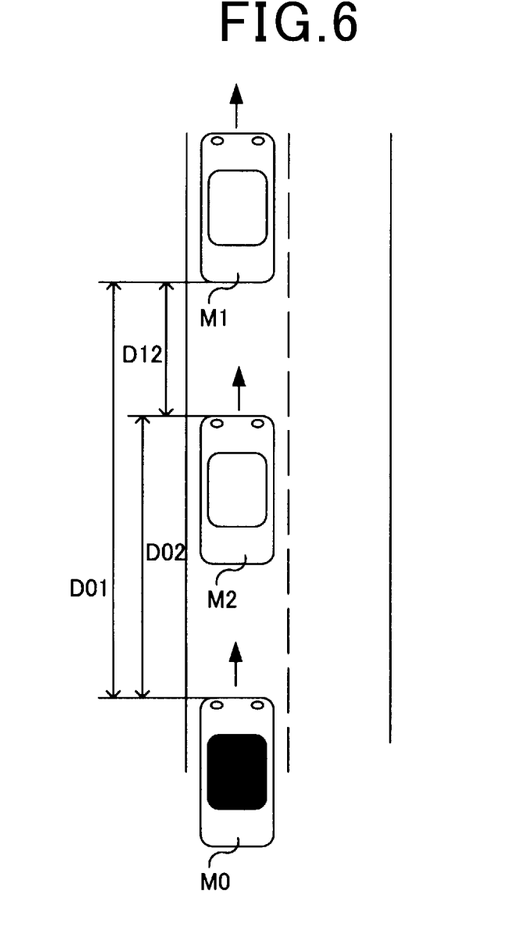

Otherwise, as shown in FIGS. 5 and 6, when detecting, as a cut-in vehicle M2, another vehicle M2a traveling on an adjacent lane side-by-side the own vehicle M0, which changes from the adjacent lane to the traveling lane of the own vehicle M0 (see YES in step S100), the CPU 101 acquires attribute information of the cut-in vehicle M2 (step S110).

The attribute information acquired in step S110 includes, for example, an inter-vehicle distance D02 between the own vehicle M0 and the cut-in vehicle M2, a relative speed V02 of the cut-in vehicle M2 with respect to the own vehicle M0, and a lateral position of the cut-in vehicle M2, which is a position of the cut-in vehicle M2 in the lateral direction, with respect to the own vehicle M0.

The position in the lateral direction means a position in the width direction of a lane, that is, a position in the width direction of the own vehicle M0.

The CPU 101 can obtain the inter-vehicle distance D02 using a known method. For example, the CPU 101 can calculate a time difference between a transmitting timing of a transmission signal with a modulated amplitude, a modulated frequency, and/or a modulated phase and a receiving timing of a received signal in accordance with correlation between the transmission signal and the received signal, thus calculating, based on the time difference, the inter-vehicle distance D02.

The CPU 101 can obtain the relative speed V02 using a known method. For example, the CPU 101 can calculate the relative speed V02 using the Doppler effect or the rate of distance change with respect to time.

The CPU 101 can obtain the lateral position using a known method. For example, the CPU 101 can calculate the lateral position based on an angle of incidence of the received signal. Note that the attribute information can represent information about the traveling state of the cut-in vehicle M2.

The CPU 101 executes an acceleration determination subroutine for determining whether the cut-in vehicle M2 is accelerable (step S120).

Determination of whether the cut-in vehicle M2 is accelerable represents determination of the traveling state of the cut-in vehicle M2.

The following describes the acceleration determination subroutine with reference to FIG. 4.

The CPU 101 determines whether a preceding vehicle M1 is present in the traveling lane of the own vehicle M0, that is, whether the preceding vehicle M1 is detected (step S121).

Each of the examples of FIGS. 5 and 6, illustrates a case where the preceding vehicle M1 is present, so that the CPU 101 detects the preceding vehicle M1 before detecting the cut-in vehicle M2. The preceding vehicle M1 is a vehicle traveling in the traveling lane of, and ahead of, the own vehicle M0.

The CPU 101 determines whether a preceding vehicle M1 is present based on the detection signals sent from the millimeter wave radar 21 that serves as a detection unit. For example, when the millimeter wave radar 21 detects the presence of an object, the CPU 101 can determine that a preceding vehicle M1 is present regardless of a detected distance from the own vehicle M0 to the detected position of the object.

Alternatively, the CPU 101 can determine that a preceding vehicle M1 is present instead of the cut-in vehicle M2 when the detected distance is within a predetermined distance, such as 50 m for a general road or 100 m for a highway, without the need of determining collision avoidance.

In addition, the CPU 101 can determine whether a preceding vehicle M1 is present using, in addition to the above conditions, a condition whether a detected object has a shape conforming with a vehicle using the image data acquired by the monocular camera 22.

When detecting a preceding vehicle M1 (YES in step S121), the CPU 101 acquires attribute information of the preceding vehicle M1 (step S122).

The attribute information acquired in step S122 includes, for example, an inter-vehicle distance D01 between the own vehicle M0 and the preceding vehicle M1, a relative speed V01 of the preceding vehicle M1 with respect to the own vehicle M0, and a lateral position of the preceding vehicle M1, which is a position of the preceding vehicle M1 in the lateral direction, with respect to the own vehicle M0.

The position in the lateral direction means a position in the width direction of a lane, that is, a position in the width direction of the own vehicle M0.

The CPU 101 can obtain the inter-vehicle distance D01 using a known method. For example, the CPU 101 can calculate a time difference between a transmitting timing of a transmission signal with a modulated amplitude, a modulated frequency, and/or a modulated phase and a receiving timing of a received signal in accordance with correlation between the transmission signal and the received signal, thus calculating, based on the time difference, the inter-vehicle distance D01.

The CPU 101 can obtain the relative speed V01 using a known method. For example, the CPU 101 can calculate the relative speed V01 using the Doppler effect or the rate of distance change with respect to time.

The CPU 101 can obtain the lateral position using a known method. For example, the CPU 101 can calculate the lateral position based on an angle of incidence of the received signal.

The CPU 101 calculates a relative relationship between the preceding vehicle M1 and the cut-in vehicle M2 (step S123).

The relative relationship calculated in step S123 includes an inter-vehicle distance D12 between the preceding vehicle M1 and the cut-in vehicle M2, a relative speed V12 of the cut-in vehicle M2 with respect to the preceding vehicle M1, and a time-to-collision TTC12 calculated from the inter-vehicle distance D12 and the relative speed V12.

The inter-vehicle distance D12 is acquired by subtracting the inter-vehicle distance D02 between the own vehicle M0 and the cut-in vehicle M2 from the inter-vehicle distance D01 between the own vehicle M0 and the preceding vehicle M1.

The relative speed V12 is acquired by subtracting the relative speed V02 of the cut-in vehicle M2 with respect to the own vehicle M0 from the relative speed V01 of the preceding vehicle M1 with respect to the own vehicle M0.

The time-to-collision TTC means a margin time until a following vehicle reaches, that is, contacts with, and collides with the preceding vehicle when the following vehicle travels at a current relative speed in the inter-vehicle distance D. That is, the time-to-collision TTC is calculated in accordance with the following equation:

$$TTC=D/V$$

The time-to-collision TTC12 of the cut-in vehicle M2 with respect to the preceding vehicle M1 is therefore calculated in accordance with the following equation:

$$TTC12=D12/V12$$

When the preceding vehicle M1 cannot be detected after the detection of the cut-in vehicle M2, the inter-vehicle distance D01 between the own vehicle M0 and the preceding vehicle M1 may be acquired by extrapolating and complementing the inter-vehicle distance D01 immediately before the preceding vehicle M1 cannot be detected. A case where the preceding vehicle M1 cannot be detected is, for example, a case where the lateral positions of the preceding vehicle M1 and the cut-in vehicle M2 overlap with each other.

Following the operation in step S123, the CPU 101 determines whether the cut-in vehicle M2 is accelerable after the cutting-in operation (step S124).

Upon determining that the cut-in vehicle M2 is not accelerable (NO in step S124), the CPU 101 determines that the cut-in vehicle M2 is not accelerable (step S125), and then terminates the acceleration determination subroutine.

The CPU 101 can determine whether the acceleration of the cut-in vehicle M2 is possible after the cut-in operation using the time-to-collision TTC12.

Upon determining that the time-to-collision TTC12 is more than a lower-limit TTCr1 of an acceleration determination time, which is expressed by TTC12<TTCr1, the CPU 101 determines that the cut-in vehicle M2 is accelerable.

The acceleration determination time represents time required for the cut-in vehicle M2 is able to accelerate after the cut-in operation of the cut-in vehicle M2. For example, the lower limit TTCr1 of the acceleration determination time is set to, for example, 3 seconds beforehand.

The CPU 101 can perform the determination of whether the cut-in vehicle M2 is accelerable after the cut-in operation of the cut-in vehicle M2 using the relative speed or the inter-vehicle distance between the preceding vehicle M1 and the cut-in vehicle M2 in place of the time-to-collision TTC.

For example, the CPU 101 can determine that the cut-in vehicle M2 is unable to accelerate when the relative speed V12 of the cut-in vehicle M2 is lower than a predetermined determination value or is a negative value. The CPU 101 can determine that the cut-in vehicle M2 is unable to accelerate when the inter-vehicle distance is smaller than a predetermined determination value.

Furthermore, the CPU 101 can determine that the cut-in vehicle M2 is unable to accelerate when a change of the time-to-collision TTC or a change of the relative speed is rapid, that is, when the relative acceleration is large.

Additionally, the CPU 101 can determine whether the cut-in vehicle M2 is able to accelerate based on whether the cut-in vehicle M2 is able to overtake the preceding vehicle M1 while steering.

For example, when the cut-in vehicle M2 changes the traveling course from the right lane of the own vehicle M0, the CPU 101 can determine whether the cut-in vehicle M2 is able to overtake the preceding vehicle M1 while steering based on whether an empty space is present in the left lane of the own vehicle M0.

When an empty space is present in the left lane of the own vehicle M0, the CPU 101 can determine that the cut-in vehicle M2 is able to overtake the preceding vehicle M1 while steering, thus determining that the cut-in vehicle M2 is accelerable.

When there is not an empty space present in the left lane of the own vehicle M0, the CPU 101 determines that the cut-in vehicle M2 is unable to overtake the preceding vehicle M1 while steering.

When determining that the cut-in vehicle M2 is accelerable after the cut-in operation (YES in step S124), the CPU 101 determines that the cut-in vehicle M2 is accelerable (step S126), terminating the acceleration determination subroutine.

That is, when TTC12≥TTCr1 is established, the CPU 101 determines that the cut-in vehicle M2 is accelerable.

Otherwise, when detecting no preceding vehicles M1 (NO in step S121), the CPU 101 determines that the cut-in vehicle M2 is accelerable (step S126), terminating the acceleration determination subroutine.

A case where no preceding vehicles M1 are present means, for example, that there are no other vehicles in the detection range of the millimeter wave radar 21 or that the inter-vehicle distance between the own vehicle M0 and the preceding vehicle M1 is equal to or more 50 m on a general road.

Returning to FIG. 3, the description will be continued.

Upon determining that the cut-in vehicle M2 is accelerable (YES in step S130), the CPU 101 sets the braking assistance level to the standard value in step S160, terminating the braking assistance level determination routine.

Otherwise, upon determining that the cut-in vehicle M2 is not accelerable, that is, the cut-in vehicle M2 is unable to accelerate (NO in step S130), the CPU 101 sets the braking assistance level to a high value higher than the standard value (step S140).

The braking assistance level means a level for determining a degree of braking assistance for avoiding a collision.

The standard value of the braking assistance level for example represents a value of the braking assistance level for achieving braking force that enables a vehicle to be stopped without making an occupant feel high deceleration G because a sufficient inter-vehicle distance is maintained.

The high value of the braking assistance level represents a value of the braking assistance level for achieving braking force that enables a vehicle to be quickly stopped with high deceleration G because the inter-vehicle distance is not sufficient. The braking force based on the high value of the braking assistance level is larger than the braking force based on the standard value of the braking assistance level.

The braking force is subject to, for example, the coefficient of friction between a tire and a road surface. The braking force controllable by the own vehicle is braking torque implemented by the braking devices 502.

For example, the braking assistance actuator 30 may increase brake fluid pressure applied to the braking devices 502 via the braking line 503 to thereby increase the braking force. Additionally, the braking actuator 30 may increase the rate of increase in the brake fluid pressure per unit of time, which is applied to the braking devices 502 via the braking line 503 to thereby increase the braking force. Moreover, the braking actuator 30 may pressurize the braking lines 503 to make the rising of the braking force be steeper, thus increasing the braking force.

Increasing the rate of increase in the brake fluid pressure per unit of time or making the rising of the braking force be steeper serves to make earlier a braking timing.

The braking assistance level includes determination sensitivity of the braking assistance. The determination sensitivity for the high value of the braking assistance level is higher than the determination sensitivity for the standard value of the braking assistance level. That is, the determination sensitivity for the high value of the braking assistance level is set to more easily perform the braking assistance.

For example, the determination sensitivity can be changed by changing a determination threshold for determining the time-to-collision TTC. The determination threshold for the high value of the braking assistance level can be set smaller than the determination threshold for the standard value of the braking assistance level. The determination threshold, that is, a determination time, is set smaller, so that the time-to-collision TTC more easily exceeds the determination threshold, and the braking assistance is more easily performed, and a time until the braking assistance is performed becomes smaller. The braking assistance level can also be regarded as a feasible braking distance. The braking distance for the high value of the braking assistance level is shorter than the braking distance for the standard value of the braking assistance level.

The CPU 101 determines whether an elapsed time tc that has elapsed since the detection of the cut-in vehicle M2 exceeds an initialization time t1 of the braking assistance level (step S150), and waits until the elapsed time tc exceeds the initialization time t1 (tc>t1) is satisfied (NO in step S150). When the elapsed time tc exceeds the initialization time t1 (tc>t1) (YES in step S150), the CPU 101 sets the braking assistance level to the standard value in step S160, terminating the acceleration determination subroutine. When the elapsed time tc that has elapsed since the detection of the cut-in vehicle M2 becomes longer than a predetermined time, there is a high possibility that a driver of the own vehicle M0 takes a measure that for example increases the inter-vehicle distance between the own vehicle M0 and the cut-in vehicle M2. Because the possibility of a collision between the own vehicle M0 and the cut-in vehicle M2 becomes lower, the braking assistance level is initialized at a timing beyond the initialization time t1, that is, is set to the standard value.

Figure 7:
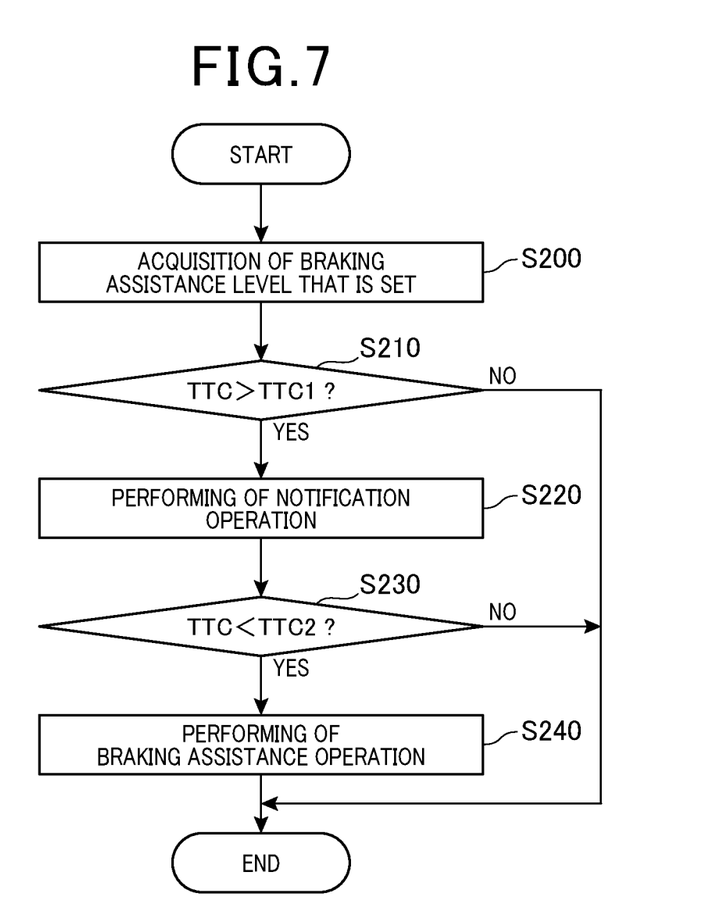
FIG. 7 is a flowchart showing a braking assistance routine performed by the braking assistance apparatus according to the first embodiment.

The following describes a braking assistance routine according to the first embodiment with reference to FIG. 7.

The braking assistance routine is performed independently of the braking assistance level determination routine. The CPU 101 runs the braking assistance program P2 to thereby execute the braking assistance routine illustrated in FIG. 7 every predetermined interval from a start time to a stop time of a control system of the own vehicle or from turn-on of a start switch to turn-off of the start switch.

The CPU 101 acquires the braking assistance level determined set forth above (step S200). Next, the CPU 101 calculates the time-to-collision TTC of the own vehicle M0 with respect to each of the forward vehicles in accordance with the attribute information of the forward vehicle acquired by the millimeter wave radar 21 and the monocular camera 22, and determines whether the calculated time-to-collision TTC is less than a predetermined first threshold TTC1, which is, for example, 0.5 seconds (step S210).

The forward vehicles include the preceding vehicle M1 and the cut-in vehicle M2.

Upon determining that the time-to-collision TTC is less than the first threshold TTC1, which is expressed by TTC<TTC1, (YES in step S210), the CPU 101 performs a notification operation in step S220. The notification operation is an operation for prompting a driver to perform a braking operation. For example, the notification operation is configured to output warning sound indicative of prompting the driver to perform a braking operation, display, on a dashboard, information indicative of prompting the driver to perform a braking operation, or vibrate the steering wheel for prompting the driver to perform a braking operation.

Otherwise, upon determining that the time-to-collision TTC is equal to or more than the first threshold TTC1 (NO in step S210), the CPU 101 terminates the braking assistance routine at the present timing.

After performing the notification operation, the CPU 101 determines whether the time-to-collision TTC with respect to each of the forward vehicles is less than a second threshold TTC2 predetermined, for example, 0.3 seconds (step S230).

The second threshold TTC2 is set to be smaller than the first threshold TTC1, and represents a time required to perform one or more braking assistance operations without waiting for the braking operation of the driver.

Upon determining that the time-to-collision TTC with respect to each of the forward vehicles is less than a second threshold TTC2, which is expressed by TTC<TTC2 (YES in step S230), the CPU 101 performs the braking assistance operations (step S2400), and then terminates the braking assistance routine at the present timing.

The braking assistance level at the time of the braking assistance operations has the value that has been set as set forth above.

Otherwise, upon determining that the time-to-collision TTC with respect to each of the forward vehicles is equal to or more than the second threshold TTC2 (NO in step S230), the CPU 101 terminates the braking assistance routine at the present timing.

As described above, the first threshold TTC1 and the second threshold TTC2 used in the braking assistance routine for the high value of the braking assistance level can be changed to be smaller than those for the standard value of the braking assistance level.

Note that an example of the braking assistance routine illustrated in FIG. 7 is designed to perform the braking assistance operations after performing the notification operation. The braking assistance routine however can be modified to perform the braking assistance operations without performing the notification operation.

For example, when the braking assistance level is set to the high value, the time-to-collision TTC is assumed to be short. For this reason, the braking assistance routine can be designed to perform the braking assistance operations without performing the notification operation when the braking assistance level is set to the high value. The notification operation and the braking assistance operation can be performed simultaneously Moreover, the notification operation can be continued periodically until the braking assistance operation is performed. Alternately, the notification operation is performed once until the braking assistance operation is performed.

As described above, the braking assistance apparatus 10 according to the first embodiment is configured to set the braking assistance level to either the high value or the standard value in accordance with the traveling state of the cut-in vehicle M2.

More specifically, the braking assistance apparatus 10 is configured to set the braking assistance level to 1. The high value upon determining that the cut-in vehicle M2, which has changed its travelling course to the travelling lane of the own vehicle M0, is unable to accelerate 2. The standard value upon determining that the cut-in vehicle M2, which has changed its travelling course to the travelling lane of the own vehicle M0, is able to accelerate This configuration solves a problem due to the braking assistance level being set to the high value in response to detection of the cut-in vehicle M2.

That is, the braking assistance apparatus 10 according to the first embodiment is configured not to set the braking assistance level to the high value upon determining that the cut-in vehicle M2 is able to accelerate even under a condition that a braking assistance operation for the high value of the braking assistance level is conventionally performed.

As a result, when performing the braking assistance operation based on the high value of the braking assistance level for addressing the cut-in vehicle, this configuration of the braking assistance apparatus 10 makes it possible to reduce the braking assistance operation at an early timing, and prevent or reduce a contact between the cut-in vehicle and the following own vehicle. This configuration also reduces or prevents discomfort that an occupant feels due to the G force of high frequency deceleration operations.

Note that the braking assistance operation at the early timing means, when there is a possibility that the cut-in vehicle travels away from the own vehicle, the braking assistance operation performed early without considering the possibility that the cut-in vehicle travels away from the own vehicle. In this case, even if the braking assistance operation is not performed, the cut-in vehicle and the own vehicle are unlikely to contact or have a collision with each other, resulting in no need of performing the braking assistance operation.

The braking assistance apparatus 10 according to the first embodiment is configured to determine, if the preceding vehicle M1 is present, whether the cut-in vehicle M2 is accelerable based on the relative relationship between the preceding vehicle M1 and the cut-in vehicle M2.

This configuration therefore determines the behavior of the cut-in vehicle M2, which has changed its traveling course to the traveling lane of the own vehicle M0, as a correlation of the preceding vehicle M1, thus improving the accuracy of determining the behavior of the cut-in vehicle M2.

The braking assistance apparatus 10 according to the first embodiment is configured to perform the braking assistance operation for the high value of the braking assistance level upon determining that the cut-in vehicle M2 is unable to accelerate. This configuration reduces or prevents a collision between the cut-in vehicle M2 and the own vehicle M0 while solving the problem caused when the braking assistance level is set to the high value in response to detection of the cut-in vehicle M2. Note that the braking assistance level is not limited to the standard value and the high value. One or more intermediate values can be set between the standard value and the high value.

Second Embodiment

The braking assistance apparatus 10 according to the first embodiment is configured to determine, based on the time-to-collision TTC, whether to perform the notification operation to notify a collision possibility to the cut-in vehicle M2, and whether to perform the braking assistance operation for collision avoidance with the cut-in vehicle M2.

In contrast, the braking assistance apparatus 10 according to the second embodiment is configured to determine whether to perform both the notification operation and the braking assistance operation in accordance with determination parameters for example including 1. The lateral position of each of the own vehicle M0 and the cut-in vehicle M2
2. A predicted collision lateral position of the own vehicle M0 with respect to the cut-in vehicle M2
3. An existence probability of the cut-in vehicle M2

Because the configuration of the braking assistance apparatus according to the second embodiment is similar to the configuration of the braking assistance apparatus 10 according to the first embodiment, similar or equivalent parts between the first and second embodiments, to which like reference characters are assigned, are omitted or simplified to avoid redundant description.

Figure 8:
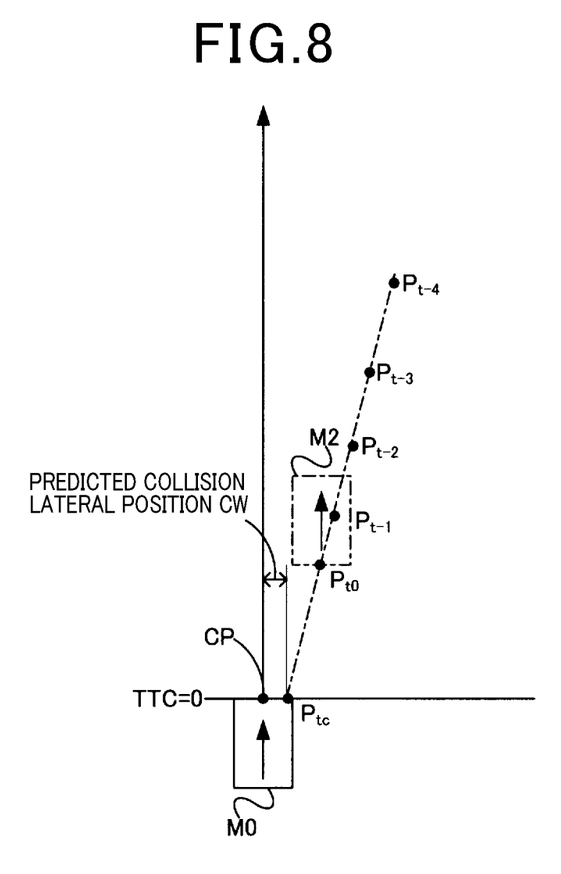
FIG. 8 is an explanatory diagram for explaining a concept of a predicted collision lateral position used in a braking assistance apparatus according to the second embodiment.

As shown in FIG. 8, the predicted collision lateral position represents a predicted lateral position at the time of a collision (TTC=0 seconds) based on a time-series change of the relative position between the own vehicle M0 and the cut-in vehicle M2 as the target object.

Reference characters $P_{t-4}$, $P_{t-3}$, $P_{t-2}$, and $P_{t-1}$ represent the relative positions of the cut-in vehicle M2 with respect to the own vehicle W0 at the fourth, third, second, and first previous detection timings from a present relative position $P_{t0}$, respectively.

At TTC=0, the difference between a center position CP of the own vehicle M0 in the width direction thereof and a relative position $P_{tc}$ of the cut-in vehicle M2 becomes a predicted collision lateral position CW. When the predicted collision lateral position CW is smaller than a predetermined predicted collision threshold CW2, it is predicted that a collision will occur at TTC=0, so that the braking assistance operation is performed. The predicted collision threshold CW2 is, for example, 80 cm, which is equal to or smaller than half of the width of a general vehicle.

Furthermore, it can be determined whether the notification operation is performed based on a predetermined predicted collision threshold CW1. The predicted collision threshold CW1 is set to, for example, the sum of the predicted collision threshold CW2 and 30 cm.

The presence probability means the reliability of the target object, and represents an index for determining whether the cut-in vehicle M2 is actually present as the target object. For example, when a reflected intensity of the millimeter waves transmitted from the millimeter wave radar is higher than a reference intensity, or when the target object is continuously detected, i.e. when the duration during which the target object is continuously detected is long, the existence probability of the target object becomes high.

Thresholds for the respective determination parameters used in the second embodiment are changed in accordance with the braking assistance level.

That is, the setting of the braking assistance level includes not only changing of the braking force or the braking timing based on control of brake fluid pressure, but also changing of an execution frequency of determination of whether to perform the braking assistance operation. Changing of the execution frequency of determination of whether to perform the braking assistance operation includes changing of the thresholds for the respective determination parameters. The change of the thresholds for the respective determination parameters can also be referred to as a change of the braking timing.

For example, the predicted collision threshold and the determination threshold for the lateral position for the high value of the braking assistance level can be set to be larger than those at the standard value of the braking assistance level. Setting each determination threshold, that is, each determination distance, to be larger enables a predicted collision lateral position WC or the lateral position to easily exceed the corresponding determination threshold, and the time until the braking assistance operation is performed is shortened. This therefore enables the braking assistance level to be higher.

For example, the determination threshold for the existence probability for the high value of the braking assistance level can be set to be smaller than that at the standard value of the braking assistance level.

Setting the determination threshold, that is, the determination distance, to be smaller enables the existence probability to easily exceed the corresponding determination threshold, and the time until the braking assistance operation is performed is shortened. This therefore enables the braking assistance level to be higher.

The braking assistance apparatus 10 according to the second embodiment is configured to change the thresholds for the respective determination parameters to accordingly change the braking assistance level between the high value and the standard value.

As described above, the braking assistance apparatus 10 according to the second embodiment achieves, in addition to the effects acquired by the braking assistance apparatus 10 according to the first embodiment, the following effects.

Specifically, the braking assistance apparatus 10 according to the second embodiment is configured to use the determination parameters to thereby perform the braking assistance operation with higher accuracy.

Specifically, the braking assistance apparatus 10 according to the second embodiment makes it possible to tighten the condition for setting the high value of the braking assistance level for addressing the cut-in vehicle, thus reducing the frequency at which the braking assistance level is set to the high value.

Note that the determination parameters used in the second embodiment can be used in combination with the time-to-collision TTC. Other determination parameters, such as the number of samples of the time series change about the relative position of the cut-in vehicle M2, or a distance to the cut-in vehicle M2, for determining the predicted collision lateral position can be used.

Third Embodiment

The braking assistance apparatus 10 according to the second embodiment is configured to change the determination threshold for each determination parameter to thereby change the braking assistance level between the high value and the standard value.

In contrast, the braking assistance apparatus 10 according to the third embodiment is configured to change the combination of the determination parameters in accordance with the braking assistance level that to thereby change the braking assistance level between the high value for the braking assistance with higher accuracy and sensitivity and the standard value for the braking assistance with normal accuracy and sensitivity.

Because the configuration of the braking assistance apparatus according to the third embodiment is similar to the configuration of the braking assistance apparatus 10 according to the first embodiment, similar or equivalent parts between the first and third embodiments, to which like reference characters are assigned, are omitted or simplified to avoid redundant description.

Figure 9:
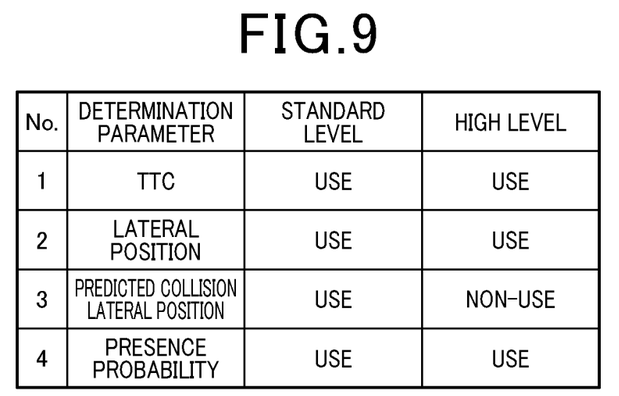
FIG. 9 is an explanatory diagram showing a combination of parameters used in collision determination in a braking assistance apparatus according to the third embodiment.

For example, as shown in FIG. 9, the time-to-collision TTC, the lateral position, the predicted collision lateral position, and the existence probability are respectively used as the determination parameters for determining whether the braking assistance operation should be performed. The third embodiment is configured to determine whether to perform the braking assistance operation using the logical product of the determination results based on the respective determination parameters.

When the braking assistance level is set to the standard value, the logical product of the determination result based on the time-to-collision TTC, the determination result based on the lateral position, the determination result based on the predicted collision lateral position, and the determination result based on the existence probability is used.

On the other hand, when the braking assistance level is set to the high value, the logical product of the determination result based on the time-to-collision TTC, the determination result based on the lateral position, and the determination result based on the existence probability is used.

Reducing the number of the determination parameters enables the determination result for the braking assistance operation to be less susceptible to the effect of the determination result based on each determination parameter.

For example, when the predicted collision lateral position, which is a prediction result based on the time series change, is not used, uncertainty that may occur due to the prediction can be eliminated, so that the braking assistance level with high accuracy or high sensitivity can be implemented.

As described above, the braking assistance apparatus 10 according to the third embodiment achieves, in addition to the effects acquired by the braking assistance apparatus 10 according to the first embodiment, the following effects.

Specifically, the braking assistance apparatus 10 according to the third embodiment is configured to change the combination of the determination parameters in accordance with the value set as the braking assistance level. This makes it possible for the braking assistance apparatus 10 according to the third embodiment to change the detection sensitivity and/or the detection accuracy for determining the braking assistance operation for addressing the cut-in vehicle without changing the braking force and the braking timing, enabling the braking assistance level to be changed between the high value and the standard value.

MODIFICATIONS

First Modification

In the first embodiment, the braking assistance level is set to the high value or the standard value in accordance with whether the cut-in vehicle M2 is accelerable. However, the braking assistance level can be set to the standard value as an initial value, and can be changed to the high value when it is determined that the cut-in vehicle M2 is not accelerable.

Second Modification

In the first embodiment, whether the cut-in vehicle M2 is accelerable is determined as the traveling state of the cut-in vehicle M2.

However, whether there is a possibility of the cut-in vehicle M2 decelerating can be determined in place of the determination of whether the cut-in vehicle M2 is accelerable.

Executing the braking assistance level determination routine set forth above enables the determination of the braking assistance level in accordance with the determination of whether there is a possibility of cut-in vehicle M2 decelerating to be implemented.

That is, when the preceding vehicle M1 is not present, the braking assistance level determination routine determines that there is no possibility of the cut-in vehicle M2 decelerating or there is a low possibility of the cut-in vehicle M2.

In contrast, when the preceding vehicle M1 is present, and the time-to-collision TTC of the cut-in vehicle M2 with respect to the preceding vehicle M1 is short, the braking assistance level determination routine determines that there is a high possibility of the cut-in vehicle M2 decelerating.

When the time-to-collision TTC of the cut-in vehicle M2 with respect to the preceding vehicle M1 or the relative speed between the preceding and cut-in vehicles M1 and M2 is changed rapidly, that is, when the relative deceleration between the preceding and cut-in vehicles M1 and M2 is large, the braking assistance level determination routine can determine that there is a high possibility of the cut-in vehicle M2 decelerating.

Third Modification

The first embodiment is configured to detect the preceding vehicle M1 using the millimeter wave radar 21 and the monocular camera 22. However, this third modification can be configured to determine whether the preceding vehicle M1 is present using information regarding traffic conditions provided through inter-vehicle communications and beacons.

Fourth Modification

In each of the first to third embodiments, the CPU 101 executes the braking assistance level determination program P1 and the braking assistance program P2 to implement, in software, an attribute acquisition unit and a collision avoidance execution unit. These attribute acquisition unit and collision avoidance execution unit can be implemented by a pre-programed hardware integrated circuit or a hardware discrete circuit.

Fifth Modification

In the first embodiment, when the notification operation is continued until the braking assistance operation is performed, it is possible to increase the volume of the sound as the notification operation over time, or change the mode of the display as the notification operation over time. The change of the mode of the display includes, for example, an increase of the display size and a change of the display color.

The present disclosure is described above based on the embodiments and the modified examples, but the above embodiments of the present disclosure are intended to facilitate understanding of the present disclosure. The present disclosure is not limited to the above embodiments. The present disclosure may be varied and modified without departing from the subject matter and the scope of the claims, and the present disclosure includes equivalents thereof. For example, technical features in the embodiments and the modifications, corresponding to the technical features in each aspect described in the summary section of the present disclosure may be replaced or combined appropriately to solve some or all of the aforementioned problems or to achieve some or all of the aforementioned effects. Furthermore, if the technical features are not described as essential in the present specification, the technical features can be deleted as appropriate.

For example, the braking assistance apparatus according to the first exemplary aspect set forth above is applied as an application example 1.

Application Example 2

In the vehicle braking assistance apparatus of the application example 2, which depends from the application example 1, the braking assistance level determination unit is configured to determine whether a preceding vehicle traveling ahead of the cut-in vehicle is present in the traveling lane of the own vehicle using the detection unit. The braking assistance level determination unit is configured to (1) Calculate, when determining that the preceding vehicle is present in the traveling lane of the own vehicle, a relative relationship between the preceding vehicle and the cut-in vehicle using the detection signal from the detection unit, the relative relationship including a distance difference and a relative speed between the preceding vehicle and the cut-in vehicle (2) Determine that the cut-in vehicle is not accelerable upon the relative relationship representing that the cut-in vehicle is not accelerable Application Example 3

In the vehicle braking assistance apparatus of the application example 3, which depends from the application example 2, the braking assistance level determination unit is configured to (1) Calculate, as the relative relationship, a time-to-collision that indicates a time until the cut-in vehicle reaches the preceding vehicle in accordance with the distance difference and relative speed between the preceding vehicle and the cut-in vehicle (2) Determine that the cut-in vehicle is not accelerable upon the calculated time-to-collision being equal to or less than a predetermined first threshold Application Example 4

In the vehicle braking assistance apparatus of the application example 4, which depends from the application example 3, the braking assistance level determination unit is configured to determine that the cut-in vehicle is accelerable upon the calculated time-to-collision being more than the predetermined first threshold, and set the braking assistance level of the own vehicle to the standard value.

Application Example 5

In the vehicle braking assistance apparatus of the application example 5, which depends from the application example 1, the braking assistance level determination unit is configured to determine that the cut-in vehicle is accelerable upon no preceding vehicles being detected, and set the braking assistance level of the own vehicle to the standard value.

Application Example 6

In the vehicle braking assistance apparatus of the application example 6, which depends from any one of the application examples 1 to 5, the braking assistance level determination unit is configured to 1. Determine whether a positional difference between a position of an additional vehicle in a lateral direction thereof and a position of a preceding vehicle in the lateral direction thereof is smaller than a cut-in determination threshold, the preceding vehicle traveling ahead of the cut-in vehicle on the traveling lane of the own vehicle, the additional vehicle being located behind the preceding vehicle and ahead of the own vehicle 2. Detect the additional vehicle as the cut-in vehicle upon determining that positional difference is smaller than the cut-in determination threshold Application Example 7

In the vehicle braking assistance apparatus of the application example 7, which depends from the application example 3 or 4, the braking assistance level determination unit is configured to detect the cut-in vehicle upon detecting that a time-to-collision to an additional vehicle travelling ahead of the own vehicle decreases rapidly.

Application Example 8

The vehicle braking assistance apparatus of the application example 8, which depends from any one of the application examples 1 to 7, includes a braking assistance control unit configured to activate the braking device based on the braking assistance level for avoiding a collision between the own vehicle and the cut-in vehicle.

What is claimed is:

1. A vehicle braking assistance apparatus comprising:
a detection unit configured to detect a target object in a traveling lane of an own vehicle; and
a braking assistance level determination unit, for determining a braking assistance level of the own vehicle by a braking device, configured to:
determine, upon detecting a cut-in vehicle that has changed a traveling course to the traveling lane of the own vehicle using a detection signal from the detection unit, whether a preceding vehicle traveling ahead of the cut-in vehicle is present in the traveling lane of the own vehicle using the detection unit;
calculate, when determining that the preceding vehicle is present in the traveling lane of the own vehicle, a relative relationship between the preceding vehicle and the cut-in vehicle using the detection signal from the detection unit, the relative relationship including a distance difference and a relative speed between the preceding vehicle and the cut-in vehicle;
determine whether the cut-in vehicle is accelerable based on the relative relationship between the preceding vehicle and the cut-in vehicle;
determine that the cut-in vehicle is not accelerable upon the relative relationship indicating that the cut-in vehicle is not accelerable; and
set the braking assistance level of the braking of the own vehicle to a high value that is higher than a standard value based on the cut-in vehicle not being accelerable.

2. The vehicle braking assistance apparatus according to claim 1, wherein:
the braking assistance level determination unit is configured to:
calculate, as the relative relationship, a time-to-collision that indicates a time until the cut-in vehicle reaches the preceding vehicle in accordance with the distance difference and relative speed between the preceding vehicle and the cut-in vehicle; and
determine that the cut-in vehicle is not accelerable upon the calculated time-to-collision being equal to or less than a predetermined first threshold.

3. The vehicle braking assistance apparatus according to claim 2, wherein: the braking assistance level determination unit is configured to:
determine that the cut-in vehicle is accelerable upon the calculated time-to-collision being more than the predetermined first threshold; and
set the braking assistance level of the own vehicle to the standard value.

4. The vehicle braking assistance apparatus according to claim 2, wherein:
the braking assistance level determination unit is configured to detect the cut-in vehicle upon detecting that a time-to-collision to an additional vehicle traveling ahead of the own vehicle decreases rapidly.

5. The vehicle braking assistance apparatus according to claim 1, wherein: the braking assistance level determination unit is configured to:
determine that the cut-in vehicle is accelerable upon no preceding vehicles being detected; and
set the braking assistance level of the own vehicle to the standard value.

6. The vehicle braking assistance apparatus according to claim 1, wherein: the braking assistance level determination unit is configured to:
determine whether a positional difference between a position of an additional vehicle in a lateral direction thereof and a position of a preceding vehicle in the lateral direction thereof is smaller than a cut-in determination threshold, the preceding vehicle traveling ahead of the cut-in vehicle on the traveling lane of the own vehicle, the additional vehicle being located behind the preceding vehicle and ahead of the own vehicle; and
detect the additional vehicle as the cut-in vehicle upon determining that positional difference is smaller than the cut-in determination threshold.

7. The vehicle braking assistance apparatus according to claim 1, further comprising:
a braking assistance control unit configured to activate the braking device based on the braking assistance level for avoiding a collision between the own vehicle and the cut-in vehicle.

8. The vehicle braking assistance apparatus according to claim 1, wherein:
the detection unit comprises at least one of a camera and LIDAR.

9. The vehicle braking assistance apparatus according to claim 1, wherein:
the high value of the braking assistance level represents a value of a braking assistance level for achieving a braking force that enables the own vehicle to be stopped with a high deceleration than the standard value of the braking assistance level.

10. A braking assistance method for a vehicle, comprising:
detecting a target object in a traveling lane of an own vehicle;
detecting a cut-in vehicle that has changed a traveling course to a traveling lane of an own vehicle;
determining, upon detecting the cut-in vehicle that has changed the traveling course to the traveling lane of the own vehicle, whether a preceding vehicle traveling ahead of the cut-in vehicle is present in the traveling lane of the own vehicle;

calculating, when determining that the preceding vehicle is present in the traveling lane of the own vehicle, a relative relationship between the preceding vehicle and the cut-in vehicle, the relative relationship including a distance difference and a relative speed between the preceding vehicle and the cut-in vehicle;

determining whether the cut-in vehicle in accelerable based on the relative relationship between the preceding vehicle and the cut-in vehicle;

determining that the cut-in vehicle is not accelerable upon the relative relationship indicating that the cut-in vehicle is not accelerable; and setting a braking assistance level of the braking of the own vehicle to a high value that is higher than a standard value based on the cut-in vehicle not being accelerable.

* * * * *